US008604752B2

(12) United States Patent
Cole, Jr. et al.

(10) Patent No.: US 8,604,752 B2
(45) Date of Patent: Dec. 10, 2013

(54) PORTABLE BATTERY CHARGING AND AUDIO UNIT

(75) Inventors: Steven W. Cole, Jr., Lombard, IL (US); Ravi Voruganti, Barrington, IL (US); Wing Hoi Ng, Hong Kong (CN); Kam Chow Cheung, Markham (CA)

(73) Assignee: Robert Bosch GmbH, Stuttgart (DE)

( * ) Notice: Subject to any disclaimer, the term of this patent is extended or adjusted under 35 U.S.C. 154(b) by 2036 days.

(21) Appl. No.: 11/055,341

(22) Filed: Feb. 10, 2005

(65) Prior Publication Data

US 2005/0225288 A1    Oct. 13, 2005

Related U.S. Application Data

(63) Continuation-in-part of application No. 10/685,280, filed on Oct. 14, 2003, now abandoned.

(51) Int. Cl.
*H02J 7/00*    (2006.01)
(52) U.S. Cl.
USPC ........................................................ 320/114
(58) Field of Classification Search
USPC ................ 320/114; 381/124; 455/343.1–344
See application file for complete search history.

(56) References Cited

U.S. PATENT DOCUMENTS

| | | |
|---|---|---|
| 1,511,581 A | 10/1924 | Ritter et al. |
| 1,518,508 A | 12/1924 | Hartwig |
| D134,136 S | 10/1942 | Sherman et al. |
| D134,818 S | 1/1943 | Fletcher |
| 2,473,194 A | 6/1949 | Ching-lh Chou |
| D163,645 S | 6/1951 | Shuler et al. |
| 2,565,273 A | 8/1951 | Shuler et al. |
| 2,582,330 A | 1/1952 | Hautala |

(Continued)

FOREIGN PATENT DOCUMENTS

| | | |
|---|---|---|
| CN | 1250345 | 4/2000 |
| DE | 1136764 | 9/1962 |

(Continued)

OTHER PUBLICATIONS

Carl J. Campagnuolo et al., Development of the G-76/G direct current generator for charging batteries and powering radios, p. 238-243.

(Continued)

*Primary Examiner* — Samuel Berhanu
(74) *Attorney, Agent, or Firm* — Maginot, Moore & Beck

(57) ABSTRACT

An audio power unit is disclosed which provides an audio output and charges removable battery packs as well as providing a number of AC receptacles for powering other tools and the like when the unit is connected to a source of AC power. The unit can optionally also provide DC power. When the unit is connected to a source of AC power, the AC power drives the audio unit which may be a radio or a combination radio and CD player and the AC source also powers a charger which recharges a battery pack if a battery pack is inserted into the charger receptacle. If the unit is not connected to a source of AC power, the radio may be powered by a battery pack when it is placed in the charger receptacle. When the unit is connected to a source of AC power, a relay is opened to isolate the radio unit from the charger and battery pack. The unit has a unique protective frame structure that is connected to the housing of the unit.

16 Claims, 18 Drawing Sheets

(56) References Cited

U.S. PATENT DOCUMENTS

| | | | |
|---|---|---|---|
| 2,591,438 | A | 4/1952 | Kinman et al. |
| 2,771,559 | A | 11/1956 | Montmeat |
| 2,771,560 | A | 11/1956 | Creiman |
| 3,079,510 | A | 2/1963 | Hartwig |
| 3,214,670 | A | 10/1965 | Schaf |
| 3,267,510 | A | 8/1966 | Cote |
| 3,458,794 | A | 7/1969 | Bohnstedt et al. |
| 3,521,142 | A | 7/1970 | Ludlam |
| 3,525,912 | A | 8/1970 | Wallin |
| 3,533,119 | A | 10/1970 | Dokos |
| 3,824,472 | A * | 7/1974 | Engel et al. ............ 455/343.1 |
| 3,852,652 | A | 12/1974 | Jasinski |
| 3,883,789 | A | 5/1975 | Achenbach et al. |
| 3,943,423 | A | 3/1976 | Hoffman |
| 3,962,591 | A | 6/1976 | Popka |
| 3,968,417 | A | 7/1976 | Dials |
| 3,971,889 | A | 7/1976 | Hays |
| D240,836 | S | 8/1976 | Corvette |
| 3,984,645 | A | 10/1976 | Kresch |
| 4,006,764 | A | 2/1977 | Yamamoto et al. |
| 4,045,663 | A | 8/1977 | Young |
| 4,050,493 | A | 9/1977 | Cho |
| 4,091,318 | A | 5/1978 | Eichler et al. |
| 4,095,184 | A | 6/1978 | Hochstein et al. |
| 4,188,585 | A | 2/1980 | Wissel et al. |
| 4,194,157 | A | 3/1980 | Uno |
| 4,489,268 | A | 12/1984 | Beachy |
| 4,628,242 | A | 12/1986 | Scholefield |
| 4,645,996 | A | 2/1987 | Toops |
| D296,243 | S | 6/1988 | Ohashi |
| 4,751,452 | A | 6/1988 | Kilmer et al. |
| 4,807,292 | A * | 2/1989 | Sorscher ............... 381/86 |
| 4,811,314 | A * | 3/1989 | Alves .................. 369/10 |
| 4,835,409 | A * | 5/1989 | Bhagwat et al. ......... 307/64 |
| 4,870,702 | A | 9/1989 | Azzouni |
| D307,829 | S | 5/1990 | Hasuike |
| 4,933,988 | A | 6/1990 | Thibault |
| D310,529 | S | 9/1990 | Yuen |
| 4,993,061 | A | 2/1991 | Hsieh |
| D320,210 | S | 9/1991 | Mbuthia |
| D320,600 | S | 10/1991 | Yuen |
| 5,055,986 | A | 10/1991 | Johnson |
| D321,513 | S | 11/1991 | Totsuka et al. |
| D327,468 | S | 6/1992 | Dea et al. |
| 5,118,962 | A | 6/1992 | Ishii et al. |
| 5,136,229 | A | 8/1992 | Galvin |
| 5,146,618 | A | 9/1992 | Wenner |
| 5,150,031 | A | 9/1992 | James et al. |
| 5,170,851 | A | 12/1992 | Kress et al. |
| 5,172,043 | A | 12/1992 | Toops |
| D332,768 | S | 1/1993 | Giard, Jr. |
| 5,179,747 | A | 1/1993 | Zink |
| 5,187,422 | A | 2/1993 | Izenbaard et al. |
| 5,191,277 | A | 3/1993 | Ishikura et al. |
| 5,193,220 | A | 3/1993 | Ichinohe et al. |
| 5,218,284 | A | 6/1993 | Burns et al. |
| 5,220,269 | A | 6/1993 | Chen et al. |
| 5,235,822 | A | 8/1993 | Leonovich, Jr. |
| 5,239,687 | A | 8/1993 | Chen |
| 5,245,269 | A | 9/1993 | Tooley et al. |
| 5,254,927 | A | 10/1993 | Chiang |
| 5,254,931 | A | 10/1993 | Martensson |
| 5,256,953 | A | 10/1993 | Cimbal et al. |
| 5,262,710 | A | 11/1993 | Taylor |
| 5,272,431 | A | 12/1993 | Nee |
| 5,283,654 | A | 2/1994 | Cho |
| 5,300,875 | A | 4/1994 | Tuttle |
| 5,317,249 | A | 5/1994 | Ford |
| 5,319,937 | A | 6/1994 | Fritsch et al. |
| 5,325,040 | A | 6/1994 | Bogut et al. |
| D348,461 | S | 7/1994 | Peersmann |
| D349,116 | S | 7/1994 | Peersmann |
| 5,339,956 | A | 8/1994 | Thomason |
| 5,343,136 | A | 8/1994 | Yamaguchi et al. |
| 5,344,339 | A | 9/1994 | Cheslock |
| 5,369,565 | A | 11/1994 | Chen et al. |
| 5,369,797 | A | 11/1994 | Tyree |
| 5,371,784 | A | 12/1994 | Yankura |
| 5,394,073 | A | 2/1995 | Nagai |
| 5,396,162 | A | 3/1995 | Brilmyer |
| 5,404,419 | A | 4/1995 | Artis, Jr. |
| D358,579 | S | 5/1995 | Richards et al. |
| 5,434,018 | A | 7/1995 | Sasaki et al. |
| 5,437,938 | A | 8/1995 | Mitsui et al. |
| 5,447,041 | A | 9/1995 | Piechota |
| 5,459,388 | A | 10/1995 | Illingworth et al. |
| 5,460,906 | A | 10/1995 | Leon et al. |
| 5,465,117 | A | 11/1995 | Ide et al. |
| 5,471,128 | A | 11/1995 | Patino et al. |
| 5,508,123 | A | 4/1996 | Fan |
| 5,508,126 | A | 4/1996 | Braun |
| 5,510,206 | A | 4/1996 | Akami |
| 5,510,693 | A | 4/1996 | Theobald |
| 5,552,692 | A | 9/1996 | McKillop |
| 5,568,198 | A | 10/1996 | Sakurai et al. |
| 5,572,592 | A | 11/1996 | Muckelrath |
| 5,578,875 | A | 11/1996 | Dormer et al. |
| 5,579,197 | A * | 11/1996 | Mengelt et al. ............ 361/93.4 |
| 5,584,055 | A | 12/1996 | Murui et al. |
| 5,587,250 | A | 12/1996 | Thomas et al. |
| 5,590,401 | A | 12/1996 | Ide et al. |
| 5,590,419 | A | 12/1996 | Shimo |
| 5,606,241 | A | 2/1997 | Patino et al. |
| 5,625,237 | A | 4/1997 | Saeki et al. |
| 5,628,054 | A | 5/1997 | Osaka |
| 5,633,096 | A | 5/1997 | Hattori |
| 5,638,540 | A | 6/1997 | Aldous |
| 5,650,669 | A | 7/1997 | Aldous |
| 5,651,485 | A | 7/1997 | Impastato |
| 5,656,917 | A | 8/1997 | Theobald |
| 5,657,210 | A | 8/1997 | Yamanaka |
| 5,665,485 | A | 9/1997 | Kuwayama et al. |
| 5,672,441 | A | 9/1997 | Aoki et al. |
| 5,680,026 | A | 10/1997 | Lueschen |
| 5,685,421 | A | 11/1997 | Gilmore |
| 5,689,171 | A | 11/1997 | Ludewig |
| 5,694,467 | A | 12/1997 | Young |
| D388,785 | S | 1/1998 | Yuen |
| 5,717,314 | A | 2/1998 | Wakefield |
| 5,752,205 | A | 5/1998 | Dzung et al. |
| 5,764,029 | A | 6/1998 | Coyle |
| 5,764,030 | A | 6/1998 | Gaza |
| 5,771,471 | A | 6/1998 | Alberth, Jr. et al. |
| 5,781,853 | A | 7/1998 | Johnson |
| 5,792,573 | A | 8/1998 | Pitzen et al. |
| 5,793,130 | A | 8/1998 | Anderson |
| 5,810,168 | A | 9/1998 | Eggering |
| 5,814,968 | A | 9/1998 | Lovegreen et al. |
| 5,834,921 | A | 11/1998 | Mercke et al. |
| 5,847,541 | A | 12/1998 | Hahn |
| 5,847,545 | A | 12/1998 | Chen et al. |
| 5,870,149 | A | 2/1999 | Comroe et al. |
| 5,889,383 | A | 3/1999 | Teich |
| 5,949,216 | A | 9/1999 | Miller |
| 5,979,175 | A * | 11/1999 | Ellison ............... 62/457.7 |
| 5,998,966 | A | 12/1999 | Gaza |
| 6,002,237 | A | 12/1999 | Gaza |
| 6,007,940 | A | 12/1999 | Spotnitz |
| 6,025,694 | A | 2/2000 | Mercke et al. |
| 6,051,334 | A | 4/2000 | Tsurumaru et al. |
| 6,057,608 | A | 5/2000 | Bailey, Jr. et al. |
| 6,058,320 | A | 5/2000 | Yokota |
| 6,071,639 | A | 6/2000 | Bryant et al. |
| 6,087,815 | A | 7/2000 | Pfeifer et al. |
| 6,091,225 | A | 7/2000 | Kim et al. |
| 6,112,414 | A | 9/2000 | Andis et al. |
| 6,124,699 | A | 9/2000 | Suzuki et al. |
| 6,127,797 | A | 10/2000 | Walker |
| 6,154,004 | A | 11/2000 | Higuchi |
| 6,154,008 | A | 11/2000 | Bradus et al. |
| 6,215,276 | B1 | 4/2001 | Smith |
| 6,223,025 | B1 | 4/2001 | Tsukuda |
| 6,223,835 | B1 | 5/2001 | Habedank et al. |
| 6,230,029 | B1 | 5/2001 | Hahn et al. |

(56) References Cited

U.S. PATENT DOCUMENTS

| | | |
|---|---|---|
| 6,233,343 B1 | 5/2001 | Muranami et al. |
| D444,451 S | 7/2001 | Bailey |
| 6,298,245 B1 | 10/2001 | Usui et al. |
| 6,305,185 B1 | 10/2001 | Sloan |
| 6,305,547 B1 | 10/2001 | Curran |
| 6,308,059 B1 | 10/2001 | Domes |
| 6,326,764 B1 | 12/2001 | Virtudes |
| 6,336,039 B1 | 1/2002 | Usui et al. |
| 6,374,127 B1 | 4/2002 | Park |
| 6,412,572 B2 | 7/2002 | Habedank et al. |
| 6,427,070 B1 | 7/2002 | Smith |
| 6,496,688 B2 | 12/2002 | Smith |
| 6,525,511 B2 | 2/2003 | Kubale et al. |
| 6,571,568 B1 | 6/2003 | Link |
| D479,223 S | 9/2003 | Furusho et al. |
| 6,621,246 B2 | 9/2003 | Kubale et al. |
| 6,788,026 B2 | 9/2004 | Muramatsu |
| 6,814,383 B2 | 11/2004 | Reed et al. |
| 6,921,596 B2 | 7/2005 | Kelly et al. |
| 6,927,373 B2 | 8/2005 | Jeon |
| 2001/0040798 A1 | 11/2001 | Appelberg et al. |
| 2002/0042258 A1 | 4/2002 | Domes |
| 2002/0077073 A1 | 6/2002 | Smith |
| 2002/0089306 A1 | 7/2002 | Kubale et al. |
| 2002/0113573 A1 | 8/2002 | Woodroffe et al. |
| 2002/0125857 A1 | 9/2002 | Mastaler et al. |
| 2002/0158604 A1* | 10/2002 | Smith .......................... 320/107 |
| 2002/0171391 A1 | 11/2002 | Batts-Gowins |
| 2003/0040296 A1 | 2/2003 | Smith |
| 2003/0069001 A1 | 4/2003 | Domes |
| 2003/0071598 A1 | 4/2003 | Kubale et al. |
| 2003/0090239 A1 | 5/2003 | Sakakibara |
| 2003/0117107 A1 | 6/2003 | Zick et al. |
| 2003/0169896 A1 | 9/2003 | Kirk et al. |
| 2004/0070369 A1 | 4/2004 | Sakakibara |
| 2004/0088817 A1 | 5/2004 | Cochran et al. |
| 2004/0095094 A1 | 5/2004 | Kubale et al. |
| 2004/0121645 A1* | 6/2004 | Postrel .......................... 439/374 |
| 2004/0147295 A1 | 7/2004 | Domes |
| 2004/0155267 A1 | 8/2004 | Harada et al. |
| 2004/0155627 A1 | 8/2004 | Stanesti et al. |
| 2004/0160212 A1 | 8/2004 | Mastaler et al. |
| 2004/0239287 A1 | 12/2004 | Batts-Gowins |
| 2005/0071051 A1* | 3/2005 | Leung .......................... 701/1 |

FOREIGN PATENT DOCUMENTS

| | | |
|---|---|---|
| DE | 4106557 A1 | 9/1992 |
| EP | 0090480 A2 | 10/1983 |
| EP | 0310717 A1 | 4/1989 |
| EP | 0340794 A2 | 11/1989 |
| EP | 0509284 A2 | 10/1992 |
| EP | 0 511 740 | 11/1992 |
| EP | 0511740 A1 | 11/1992 |
| EP | 0920062 A1 | 6/1999 |
| EP | 0 987 783 | 3/2000 |
| EP | 1311012 A2 | 5/2003 |
| GB | 632185 | 3/1950 |
| GB | 2195841 A | 4/1988 |
| GB | 2239567 A | 7/1991 |
| GB | 2242083 A | 9/1991 |
| JP | 61-197646 | 9/1986 |
| JP | 04-150728 | 5/1992 |
| JP | 06-268548 | 9/1994 |
| JP | 07-193444 | 7/1995 |
| JP | 07-307580 | 11/1995 |
| JP | 08-185893 | 7/1996 |
| JP | 08-195191 | 7/1996 |
| JP | 08-308113 | 11/1996 |
| JP | 09-004715 | 1/1997 |
| JP | 09-051281 | 2/1997 |
| JP | 09-200974 | 7/1997 |
| WO | WO 81/00654 | 3/1981 |
| WO | WO 87/02848 | 5/1987 |
| WO | WO 2005/041428 A1 | 5/2005 |
| WO | WO 2005/053059 A2 | 6/2005 |

OTHER PUBLICATIONS

Review: The IC2 series revealed. In: Radio & Electronics World, p. 58-63, Oct. 1981.

Larry Ledlow, The Kenwood Th-205AT Two-Meter Handheld. In: 73 Amateur Radio, p. 14, Dec. 1987.

Advertisment in Radio & Electronics World, Aug. 1988.

Robert Witmer, The UNI-8 Porta-Power Adapter. In: 73 Amateur Radio, Mar. 1990, p. 14-15.

Charles A. Geswein, Multi-Band Multi Mode Hand Held Radio. In: Proceedings of the 1996 Tactical Communications Conference, 1996, p. 335-339.

Dave Bush et al., Improved Vehicle operated auxiliary lead-acid battery charger, Aug. 1989.

Alfred H. Bellman et al., Manpack: a new solution to an old problem. In: Signal, Apr. 1977, p. 6-10.

M. Pirson, A new vehicular and manpack HF/SSB radio. In: Philips Telecommunication Review, Aug. 1979, p. 188-195.

A. Kurvits, 400 watt HF radio set for operation in extreme environments. In Communications Equipment and Systems, 1980, p. 255-259.

"Sony Do it Again" in: Radio & Electronics World, Jan. 1984, p. 23-24.

Advertisement in: Radio & Electronics World, Apr. 1984, p. 10-11.

G.N. Hobbs et al., "Scimitar H—combat net radio of the 80s", in: Communication & Broadcasting, Feb. 1985, p. 29-37.

Jason Meyers, "Getting the signal out: radio vendors broadcast quality, extension messages", in: Telephony, Mar. 31, 1997.

Paul Pinella, Gifts for grads, Dads, Moms, and marrieds, in: Saturday Evening Post, May-Jun. 1984.

Steve Ford, "A portable shortwave receiver roundup", in: QST, Aug. 1997.

WR World Receiver Satellit 700, by GRUNDIG.

Thomas Baier, The Great Grundig Satellit 700 catalog, Apr. 2002.

* cited by examiner

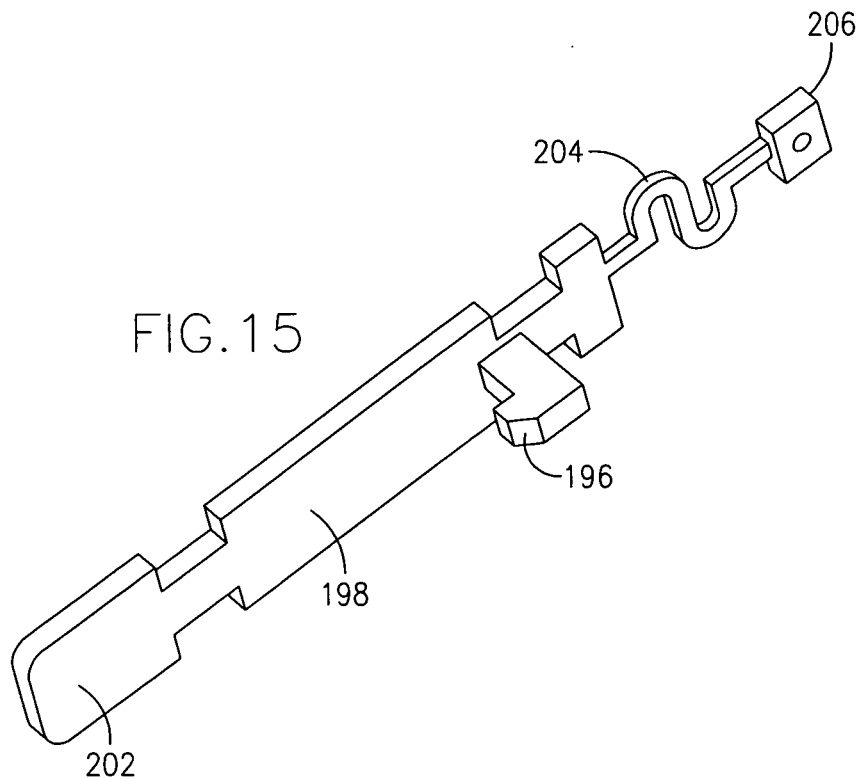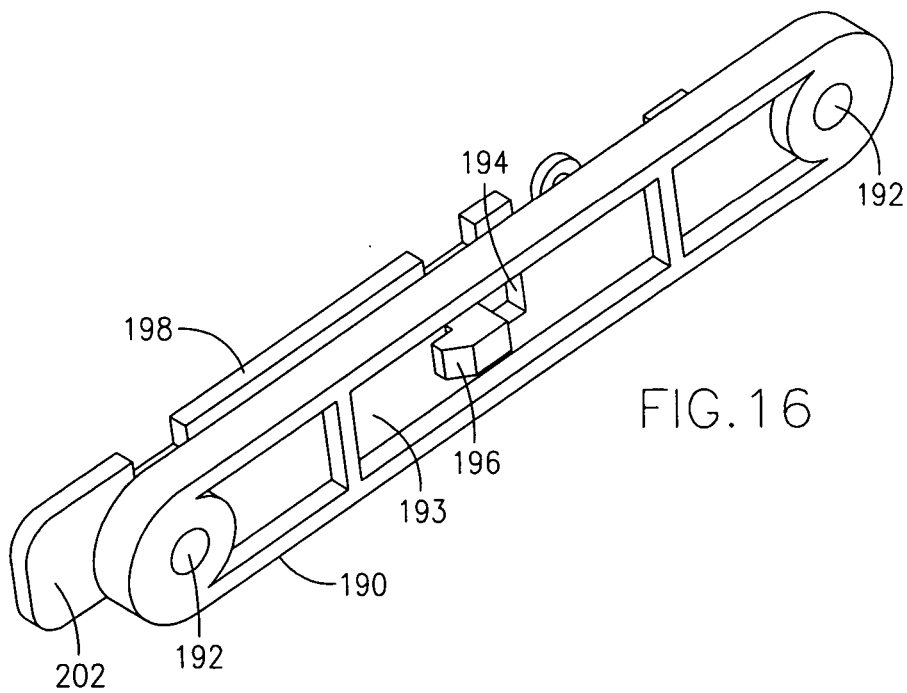

PORTABLE BATTERY CHARGING AND AUDIO UNIT

FIELD OF THE INVENTION

This is a continuation-in-part of patent application, Ser. No. 10/685,280 filed Oct. 14, 2003 now abandoned.

This invention generally relates to portable audio and battery pack charging equipment.

BACKGROUND OF THE INVENTION

Cordless power tools are frequently found and used in locations that do not have readily available or convenient sources of power. These locations include construction sites and partially completed buildings. At locations such as these, the battery operated tools provide an obvious advantage, but the battery packs eventually become depleted and need to be recharged. While some users bring a sufficient number of battery packs to last for a complete day, at some stage of the construction, there is generally at least temporary electrical service provided which may enable battery packs to be recharged on the construction site. The location of the temporary electrical service may be some distance from the actual work location and since the charger may be located some distance from the user, issues can arise that may prevent the successful completion of a charging operation. For example, another worker may take a battery pack for his own use, or the charger may simply be unplugged so that some other operation may be performed, since the number of available receptacles may be limited.

Workers also like to take audio equipment such as portable radios to construction sites so that they can listen to music and other programs while they are working. It is well known that construction sites present a tough environment for such audio equipment which is prone to being damaged over time for obvious reasons.

SUMMARY OF THE INVENTION

A preferred embodiment of an audio power unit is disclosed which provides an audio output and charges removable battery packs as well as providing a number of AC receptacles for powering other tools and the like when the unit is connected to a source of AC power. The unit can optionally also provide DC power. When the unit is connected to a source of AC power, the AC power drives the audio unit which may be a radio or a combination radio and CD player and the AC source also powers a charger which recharges a battery pack if a battery pack is inserted into the charger receptacle. If the unit is not connected to a source of AC power, the radio may be powered by a battery pack when it is placed in the charger receptacle. When the unit is connected to a source of AC power, a relay is opened to isolate the radio unit from the charger and battery pack. Other embodiments can include one or more other audio and video devices such as a satellite radio, a digital audio player, a DVD player, a VCD player and a TV set.

The unit has a unique protective frame structure that is connected to the housing of the unit. The preferred embodiment of the present invention also has a circuit that includes a relay that is adapted to isolate the battery pack and charger from the audio unit when a relay coil senses that AC power is being applied to the audio unit. If AC power is not sensed, the relay is closed so that a battery pack can drive the audio unit.

DESCRIPTION OF THE DRAWINGS

FIG. 15 is a perspective view of a sliding tab portion of the digital audio player;

FIG. 16 is a perspective view of the sliding tab portion together with a bracket of the digital audio player;

DETAILED DESCRIPTION OF THE PREFERRED EMBODIMENT

Figure 1:
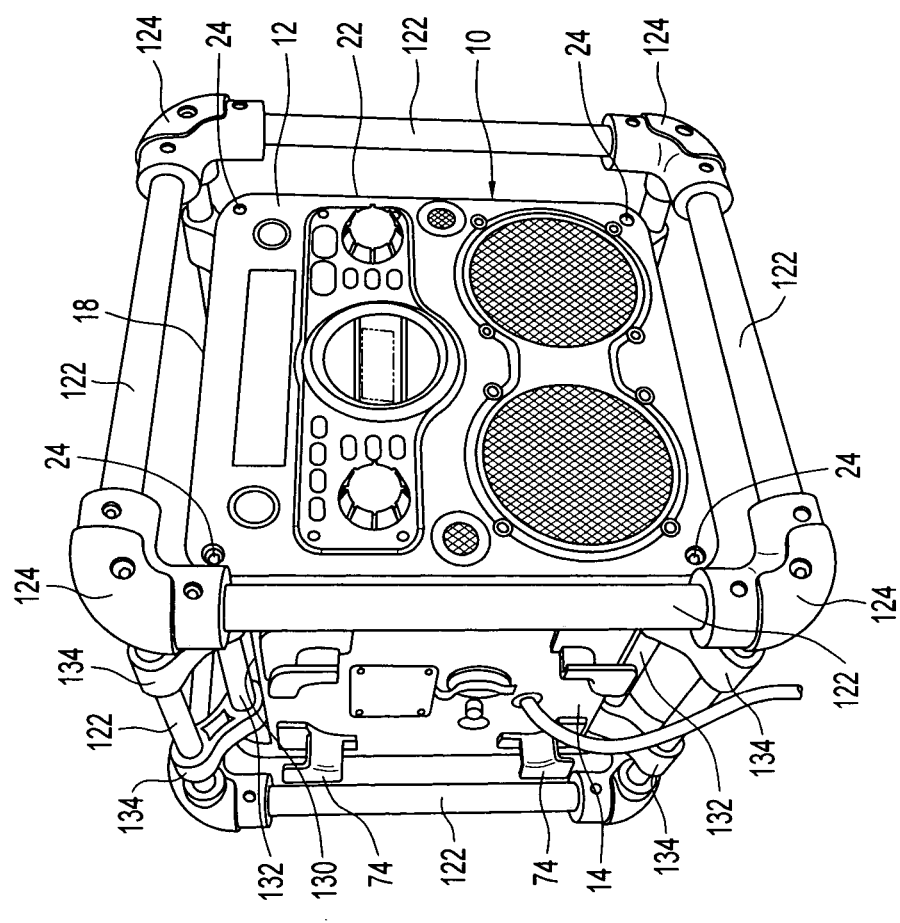
FIG. 1 is a perspective view of the front and left sides of the preferred embodiment of the present invention.

A preferred embodiment of a portable battery charging an audio unit is shown in the drawings and which includes a housing, indicated generally at 10, which is in the form of a cube, although it could be a cuboid if desired, as well as some other shaped volume. As illustrated, it includes a front face or wall 12, a left side face or wall 14, a top surface 16, a rear wall 20 (see FIG. 4) and a right side face or wall 22. The housing 10 is preferably made of a tough plastic or other molded material, and may be comprised of a few or several parts that structurally fit together in a rugged strong unit. For example, the front and back walls 12 and 20 may be generally flat unitary pieces which are connected together to one or more molded or otherwise formed front, top, bottom and rear walls that may be formed as one, two, or more components that are connected together with hex-head bolts or screws 24. While the housing 10 is in the shape of a cube, i.e., the size of each wall is generally the same, the housing may also be a cuboid where one or more of the length, height and width dimensions may be greater than the others, i.e., a rectangular box-like shape, or a more unusual volume may be defined by the walls of the housing.

Figure 2:
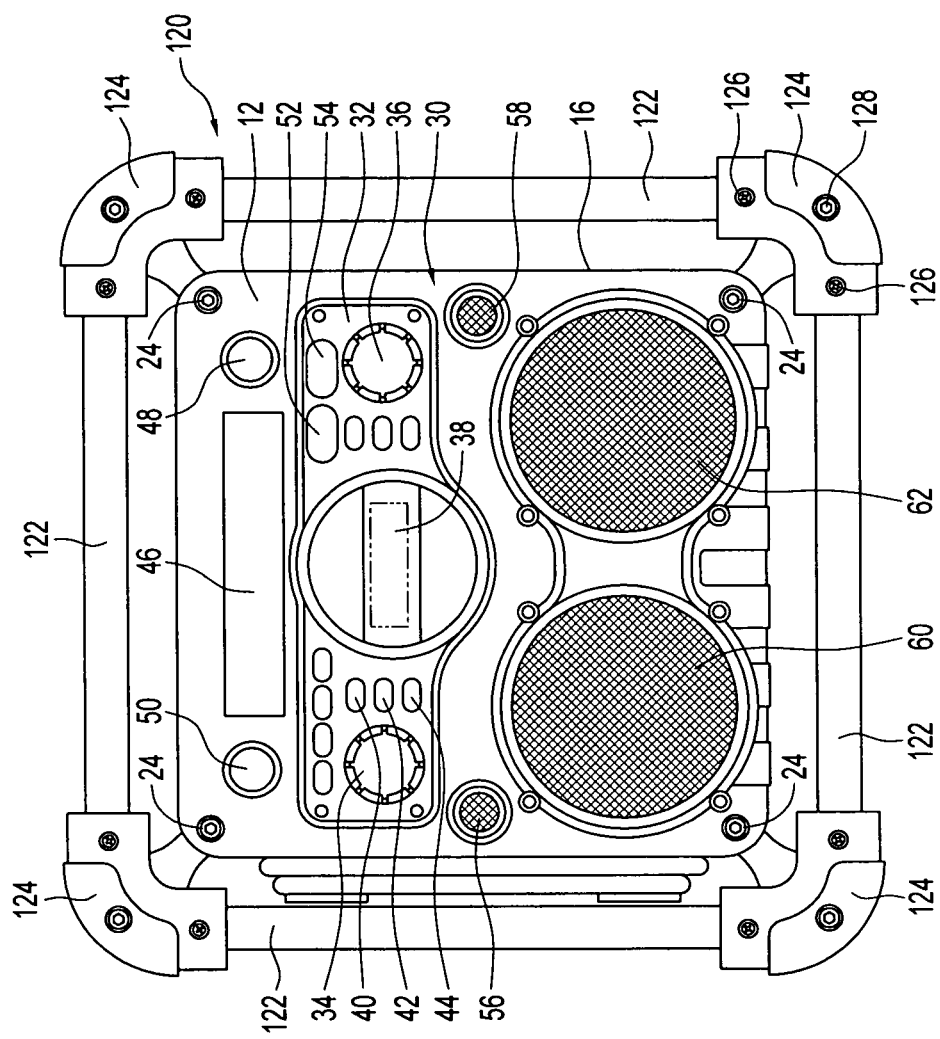
FIG. 2 is a plan view of the front of the preferred embodiment shown in FIG. 1.
Figure 3:
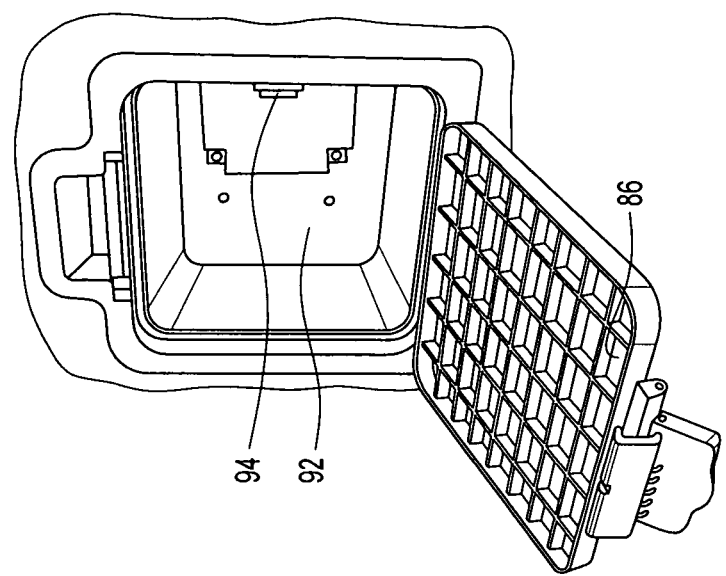
FIG. 3 is a perspective view of the rear and left side of the preferred embodiment shown in FIG. 1.

The preferred embodiment has an audio unit, indicated generally at 30, which is located in the front face 12 of the unit. As best shown in FIGS. 1 and 2, the audio unit comprises a radio that has a control panel 32 with a volume control 34, a tuning control 36, a display 38 for displaying the station identification as well as the current time. There are time adjust buttons 40, 42 and 44 with the button 42 controlling the hours, setting and the button 44 controlling the minutes setting. A CD player is also provided as part of the unit 30 and a CD tray 46 is positioned above the control panel 32. There is an eject button 48, a pause or standby button 50, as well as forward and backward adjustment buttons 52 and 54, respectively, located on the control panel 32. Speakers 56, 58, 60 and 62 are also provided and are located below the control panel 32.

Figure 6:
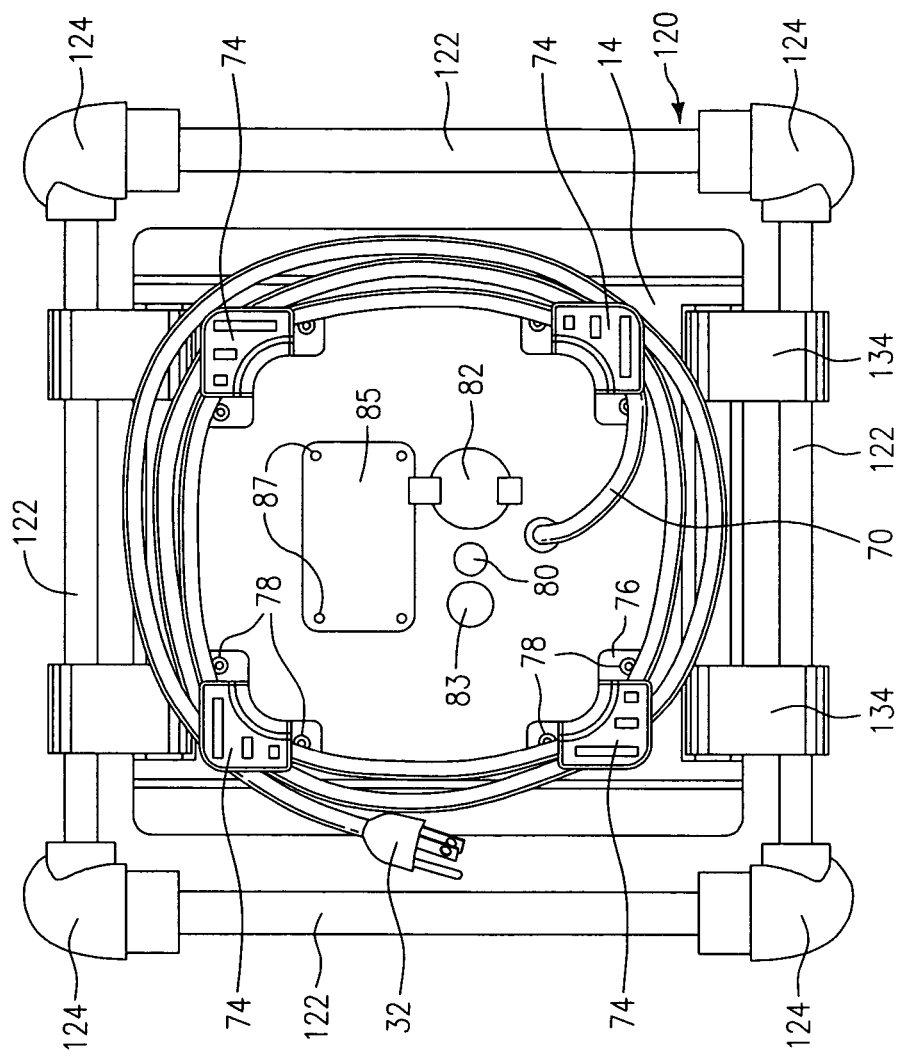
FIG. 6 is a plan view of the left side of the preferred embodiment shown in FIG. 1.
Figure 9:
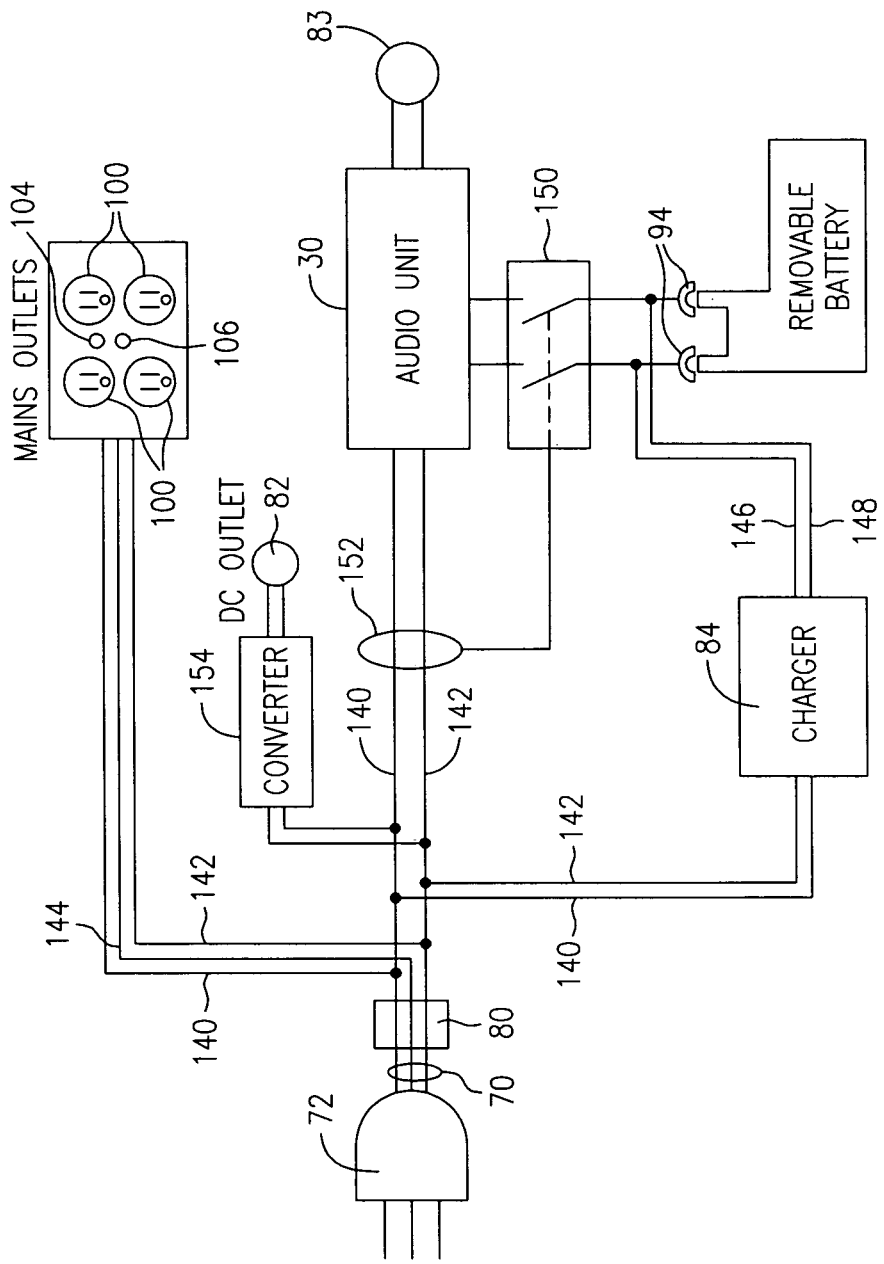
FIG. 9 is a simplified electrical schematic diagram of the preferred embodiment of the present invention.

The unit can be connected or plugged into a source of AC power using a cord 70 having a 3-prong plug 72 as best shown in FIG. 6. The unit has a cord wrap structure comprising four outwardly extending flanges 74 that are arranged in a square around which the cord can be wrapped for storage. The flanges each have a base portion 76 for mounting to the sidewall 14 and are connected thereto by screws 78 or the like. It should also be understood that the flanges 74 may be integrally formed in the sidewall 14 if desired. A fuse 80 for the circuitry to be described is accessible on the left side wall 14 as is a DC receptacle or socket 82 which is protected from the elements by a removable flexible plug that is preferably made of rubber or like material which can be inserted into the receptacle opening. A 2 channel stereo mini plug receptacle 83 is located adjacent the fuse 30 which can be used to input an auxiliary audio source that can be played through the unit. The receptacle 83 is therefore connected to the audio unit 30 as shown in FIG. 9. Also, a nameplate 85 is mounted to the left side wall 14, by four screws including the two top screws 87. The presence of an auxiliary audio source in the receptacle 83 can be detected and thereby be selected as the source for playing, or a switch 87 can be provided on the face plate 32 for selecting the integral audio unit or the unit connected to the auxiliary recepticle.

Figure 4:
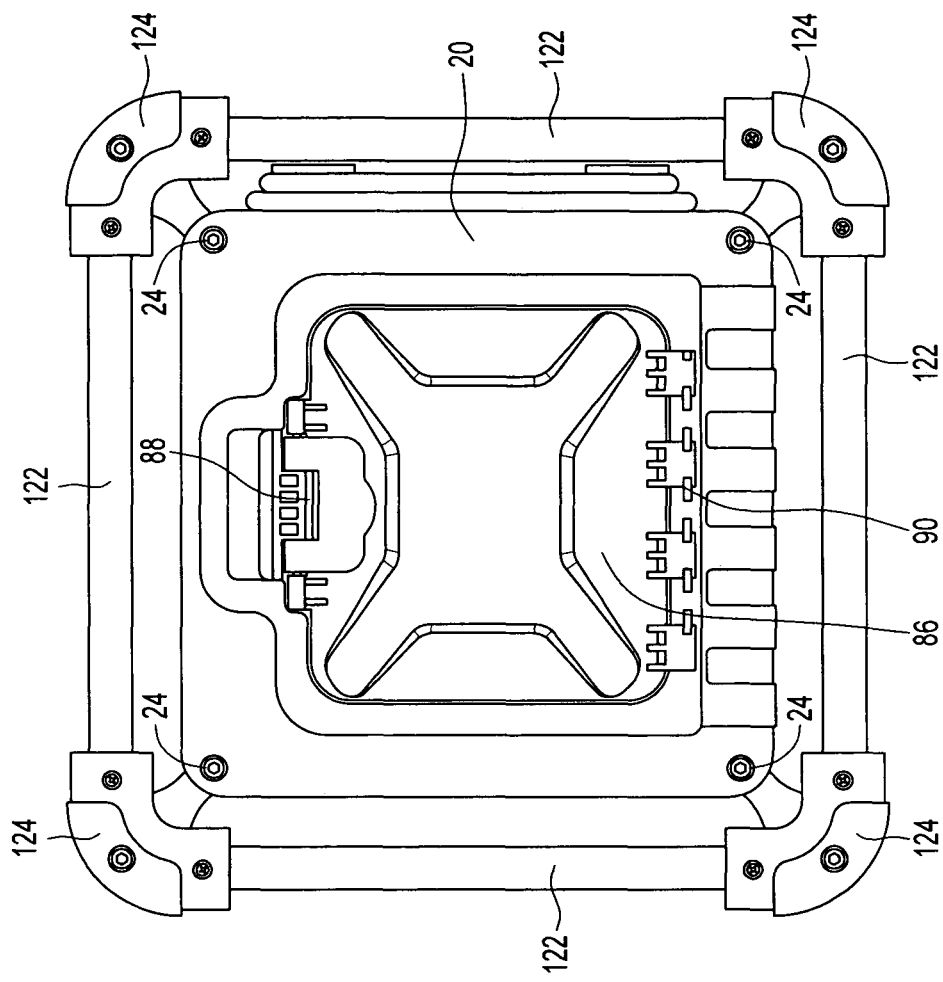
FIG. 4 is a plan view of the rear wall of the preferred embodiment shown in FIG. 1.
Figure 5:
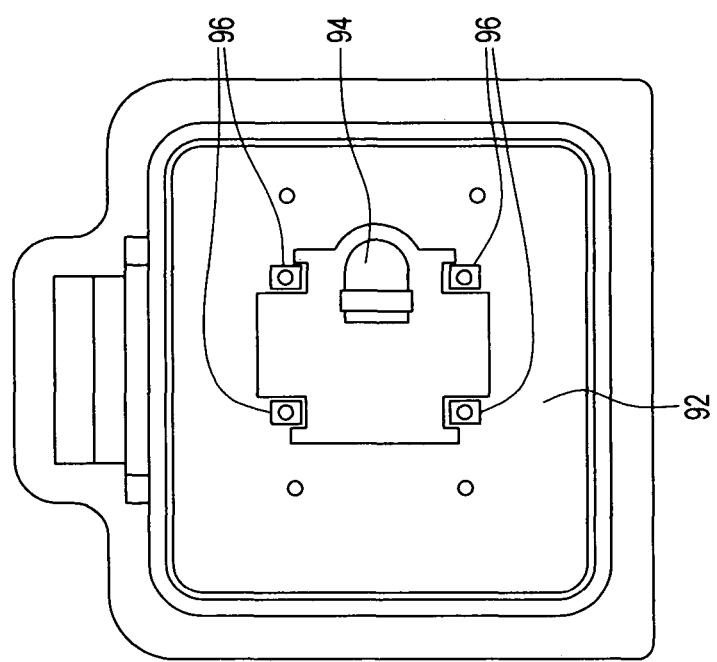
FIG. 5 is a plan view of the rear wall of the preferred embodiment shown in FIG. 1, with the door opened to show the charging receptacle.

The unit has a charger 84 internally located in the housing which is accessible through a charger door 86 as shown in FIG. 4. A handle 88 is provided at its upper end which engages a complimentary surface to hold the door shut, but which can be readily opened by a user without difficulty. A hinge 90 on the lower end of the door enables the door to be opened to reveal a holding chamber 92 that has a receptacle 94 at the bottom of the chamber 92 as shown in FIG. 5. The configuration of the receptacle 94 is complimentary to receive a battery pack such as those marketed by the Robert Bosch Tool Corporation. A number of spring clips 96 are also provided to retain the battery pack in place while it is charging, which requires the cord 78 to be connected to a source of AC power.

Figure 7:
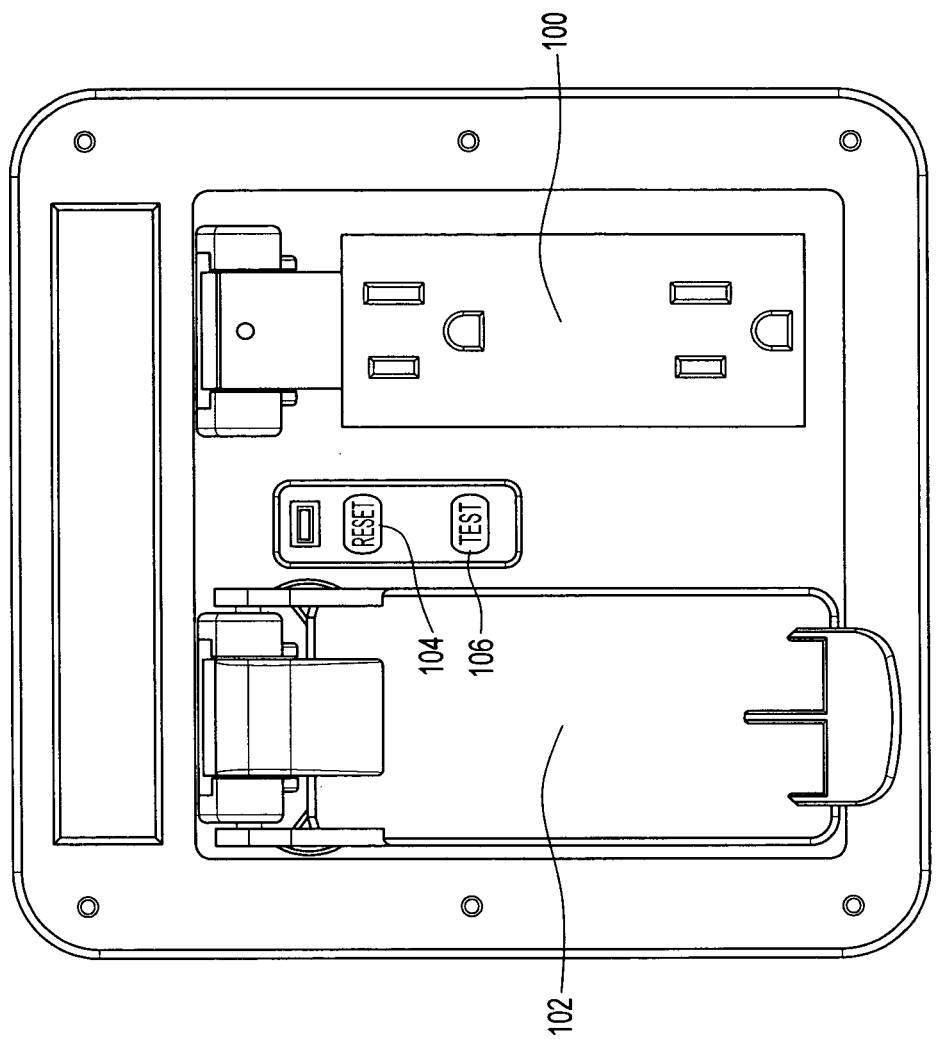
FIG. 7 is a plan view of a small portion of the right side of the preferred embodiment shown in FIG. 1.

On the right sidewall 16 and referring to FIG. 7, a pair of duplex AC outlets 100 are located beneath doors 102 (only one of which is shown) that are hinged at the top of the outlet pair. While they may be standard duplex receptacles, it is preferred that they be ground fault circuit interrupters to provide an extra measure of safety for the users, particularly given the fact that the unit may be subjected to harsh weather conditions. As is standard for ground fault circuit interrupters, a reset button 104 and test button 106 are provided.

Figure 8:
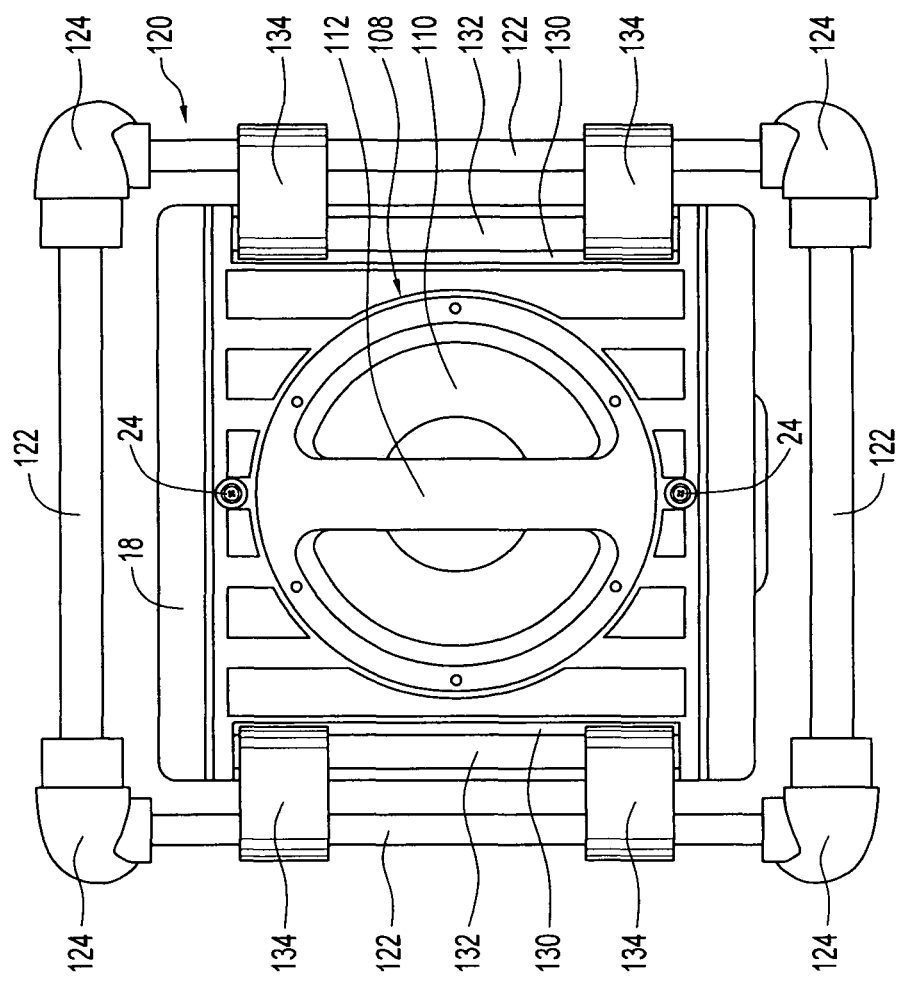
FIG. 8 is a plan view of the top of the preferred embodiment shown in FIG. 1.

To conveniently carry the unit and referring to FIG. 8, the top face of the unit 18 has a handle 108 that is formed by a generally hemispherical recess 110 that has a bridging portion 112 that extends across the recess and which together define the handle 108 that can be used to carry the unit. It should be apparent that the size of the recess be large enough so that the user can insert his hand easily into the recess to grab the bridging portion 112.

As is apparent from the drawings, the unit has a frame structure, indicated generally at 120, which is shown in virtually all of the drawings, but is best shown in FIGS. 2, 4 and 8. The frame structure 120 is larger than the housing 10 in every direction and thereby provides a protective structure for the housing itself, as well as the components that are present on each of the front, rear and side faces of the housing. The form of the frame structure 20 is that of an open faced cube in the preferred embodiment, but could also be an open faced cuboid if desired. The frame structure has a number of elongated cylindrical rods 122 that are preferably made of hollow aluminum. The rods extend in spaced relation to the interface of each two walls as is apparent from the drawings. At the intersection of three walls which occurs at each of the eight corners of the frame structure 120, three cylindrical rods 122 are terminated in a three way connector 124 that is preferably made of strong, hard plastic or plastic-like material that is capable of withstanding abusive treatment without incurring damage. As best shown in FIGS. 2 and 4, each of the connectors has a pair of set screws 126 that fit within openings in the connector 124 and which engage the side of a cylindrical rod 122 in either the horizontal or vertical direction as shown in these drawings and which has a hex head screw 128 that is positioned to engage the rod 122 oriented in the direction transverse to the horizontal and vertical direction as shown in FIGS. 2 and 4. The set screw 128 may engage the inside diameter of the hollow rod 122 or it may engage a plug or other member that is inserted into each end of such transverse to the cylindrical rods 122, such that a secure attachment of the connector to the rod is achieved. With regard to the screws 126, they may merely tighten against the outer surface of the rods in which they contact, or they may be screwed into the side of the rods.

As best shown in FIGS. 1 and 8, the housing has an elongated recess 130 located at the corner of the top and sides of the housing as well as the bottom and sides of the housing. A shorter cylindrical rod preferably having the same construction and outside diameter 132 fits within each recess and is secured at opposite ends by fitting into correspondingly sized openings in the housing. The frame structure 120 is connected to these rods 132 by connecting links 134 which have openings in opposite ends through which rods 122 and 132 may pass. There is a link 134 at the end of each recess 130, meaning that a total of eight of them are utilized to secure the frame structure 120 to the housing 12. The links 134 are preferably made of the same material as the connectors 124 so that they will not be easily damaged by the typically rough treatment that the unit may receive on a construction site.

With regard to the electrical schematic of the unit embodying the present invention and referring to FIG. 9, the audio unit 30 is shown being connected to the cord 70 via fuse 80 and lines 140 and 142. A ground 144 also extends from the outlets 100 to the plug 72. Lines 140 and 142 also extend to the outlets 100 as well as to the charger 84, with the charger 84 having output lines 146 and 148 that extend to the receptacle 94 into which a removable battery can be inserted. Lines 146 and 148 also extend to a relay 150 that is controlled by a relay coil 152 which senses whether current is flowing in the lines 140 and 142. The relay 150 is a normally closed relay which is opened when the plug 72 is connected to a source of AC power which means that the audio unit is being driven by the AC power source. It should be understood that the audio unit may actually run on DC voltage and that the audio unit may have an internal voltage converter as part of its construction.

Another converter 154 may be provided to power the DC outlet 82. When the plug 72 is connected to an AC power source, the charger 84 is operational to charge the removable battery if it is placed in the receptacle 94 and the outlets 100 are available to supply power to other tools, lights or the like, as is the DC outlet 82. If the plug 72 is removed from AC power, the relay 150 will be close circuited so that the removable battery will be connected to the audio unit and can power the audio unit. It should be understood that the charger is incapable of powering the audio unit when the relay is open circuited as shown in the drawing and is incapable of powering the audio unit 30 when AC power is not applied to the circuit inasmuch as the charger 84 does not have a resident battery or other power source other than AC power through the lines 140 and 142.

While the embodiments described above include audio units 30 that comprise a radio and also suggest a combination of a radio and a CD player, other audio as well as video sources can also be incorporated into the unit.

Figure 10:
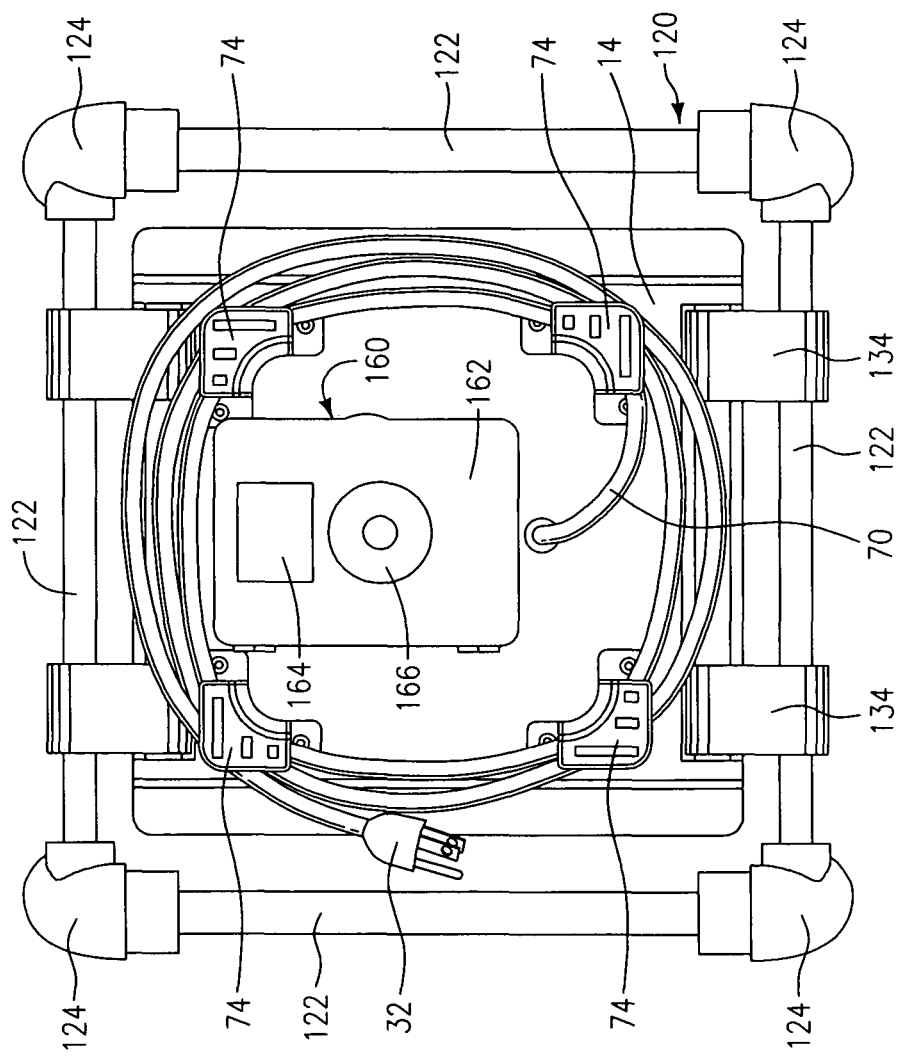
FIG. 10 is a plan view of the left side of an alternative embodiment 1 showing a portable digital audio player mounted to the left side wall.
Figure 11:
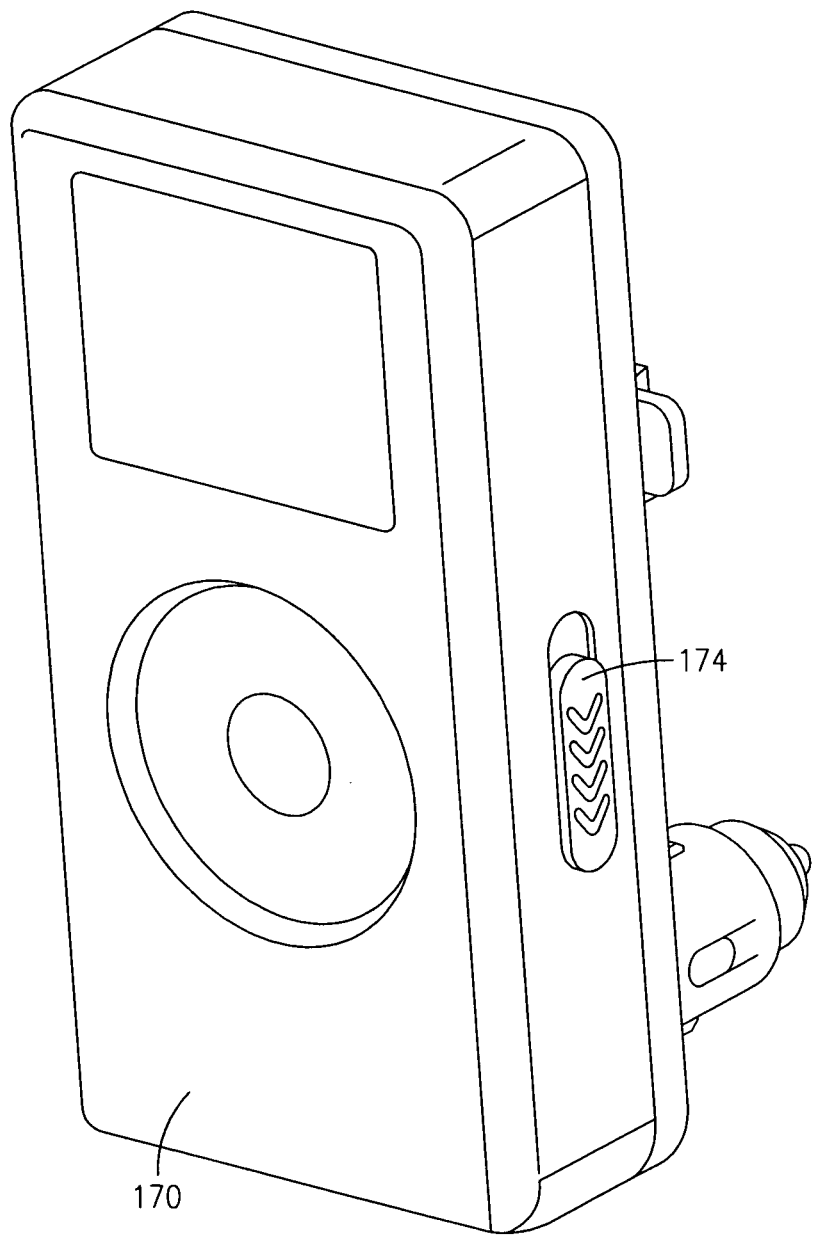
FIG. 11 is a perspective view of the left front portion of the portable digital audio player shown in FIG. 10.

In a second embodiment shown in FIG. 10, a portable digital audio player, indicated generally at 160, is shown mounted to the side wall 14. While it is not strictly visible in this drawing for the reason that it is contained in an enclosure 162 that has a window 164 for viewing the display of such a player as well as an opening 166 which preferably contains a transparent flexible membrane for limiting the entrance of dust and water into the interior of the enclosure. The illustrated enclosure 160 is particularly designed for use with a digital audio player. Such digital audio players might play a variety of formats, such as MP3, WMA, or AAC audio formats. They might be devoted digital audio players, or might also be other types of devices, such as PDAs or cell phones, that have this functionality built in. They might use various types of media, such as a hard drive, flash memory, or removable disc media. As is shown in FIGS. 10-16, the enclosure 162 has a base portion 168 and a cover portion 170 with the base and cover being attached to one another by hinges 172 and a latch mechanism 174. The latch mechanism has a hook 176 that engages a retaining surface (not shown) with the latch mechanism 176 being slidable in a slot in the cover to lock and unlock the cover from the base portion 168.

The digital audio player 160 has a connector (not shown) that is configured to interconnect with a second connector 178 in the base portion 168 when the digital audio player is placed in a cradle structure defined by a bottom surface 180 and curved side surfaces 182. Digital audio players are marketed with different models having different data storage capacities, and the thickness of them can vary accordingly. For this reason, a number of flexible resilient pads may be provided with the enclosure 162, including the pad 184 illustrated. The pad 184 may be placed in the enclosure so that the digital audio player to properly align it so that its connector will fit into the connector 178 and be held in place to prevent it from being damaged if the unit 10 is jostled or dropped, for example. In this regard, it is contemplated that there will be several pads 184 of varying thicknesses so that the user can insert or attach the correct one to support it in the base portion 168. In this regard, it is preferred that each of the pads have an adhesive backing which is covered by a thin film that can be removed so that the pad can be attached to the inside surface of the base portion 168.

Figure 12:
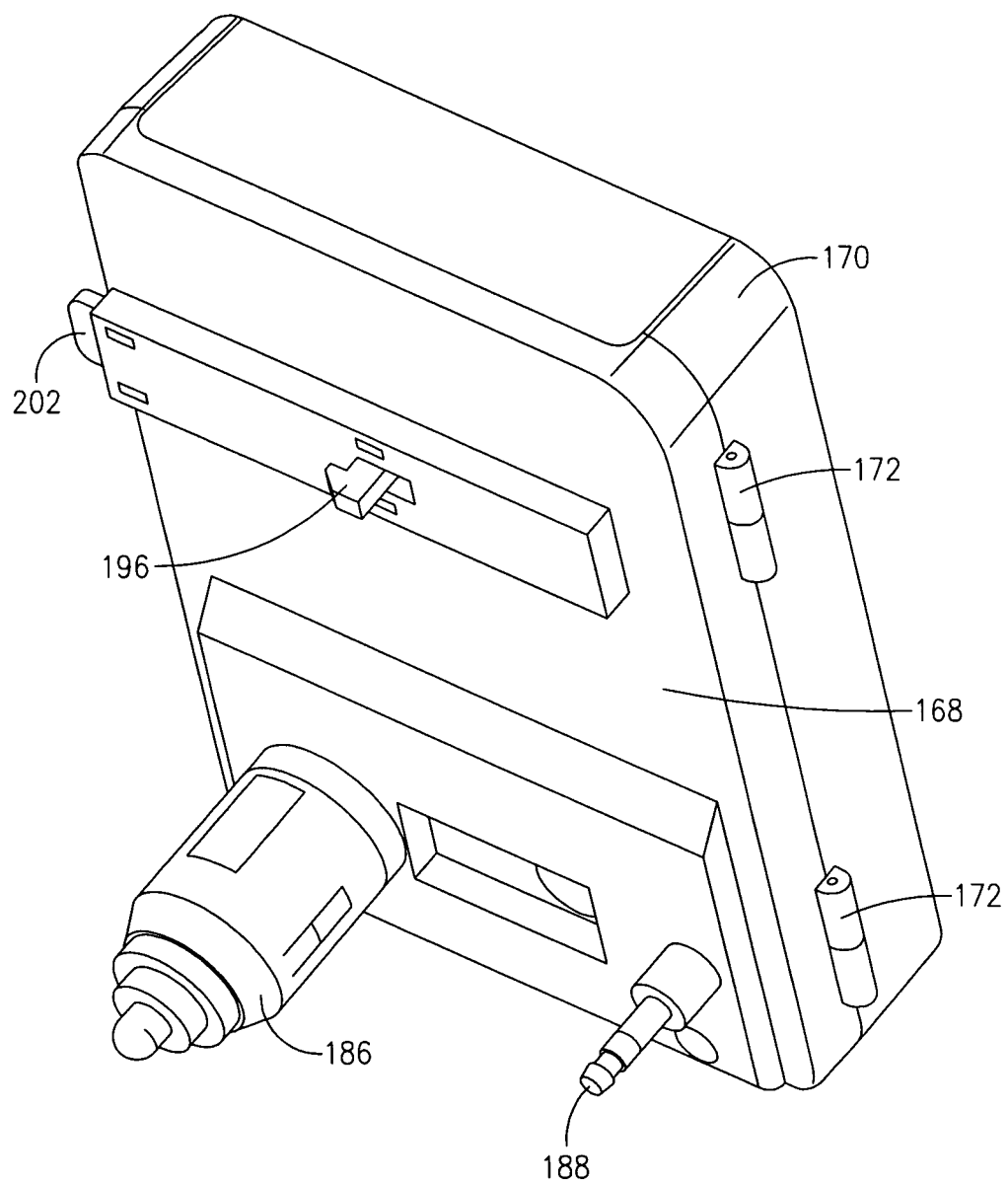
FIG. 12 is a perspective view of the left rear of the digital audio player shown in FIGS. 10 and 11.
Figure 13:
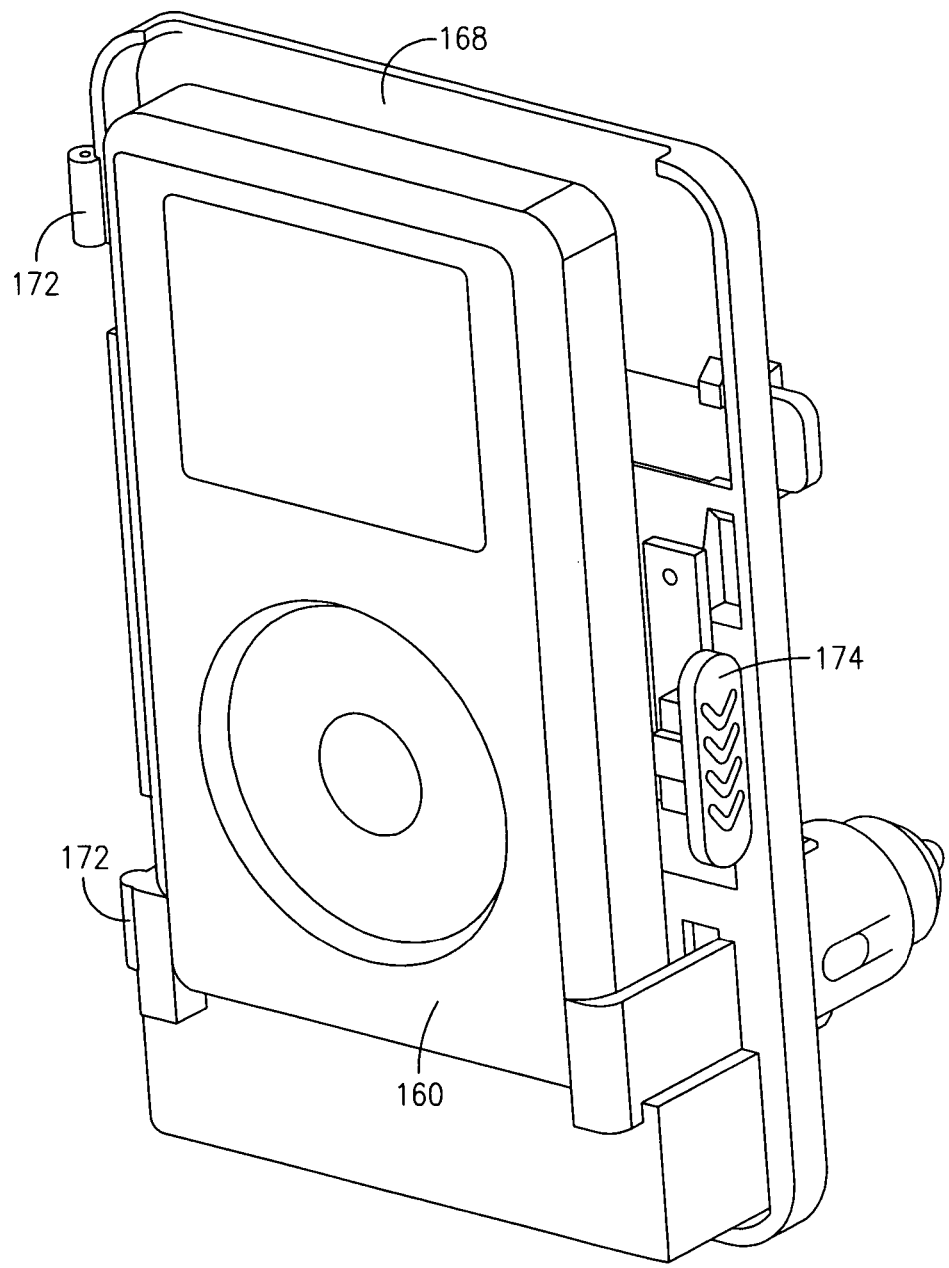
FIG. 13 is a perspective view of the left front of the digital audio player shown in FIG. 11 with portions removed.

As is best shown in FIG. 12, the back of the base portion 168 has a generally cylindrical power plug that is configured to fit in the 12 volt adaptor 82 as shown in FIG. 6, for the purpose of providing power to the digital audio player. In this regard, there is internal circuitry (not shown) interfacing the power plug with the connector 178 so that power is provided to the digital audio player. Similarly, a 2-channel stereo mini-plug 188 is also provided to fit in the mini plug receptacle 83 shown in FIG. 6 and this is also interconnected with the connector 178 so that the digital audio player signals can be communicated to the amplifier in the audio unit 30 as shown in FIG. 9 enabling the amplifier to drive the speakers 60 and 62 as is desired. It should also be understood that a toggle switch may be provided on the face plate 32 which selects either the radio receiver or the input from the mini plug receptacle 83. As is best shown in FIG. 16, a bracket 190 having holes 192 on each end is provided and is connected to the side wall 14 by removing the screws 87 and placing the bracket overlying the name plate and thereafter replacing the screws 87 to mount the bracket 190 to the side wall. In this regard, the bracket has a thicker outer periphery defining a recess 193 and an opening 194 is provided in the middle of the bracket 190 which is configured to receive a latch member 196 that is configured to be inserted into the hole 194 to latch the same.

Figure 14:
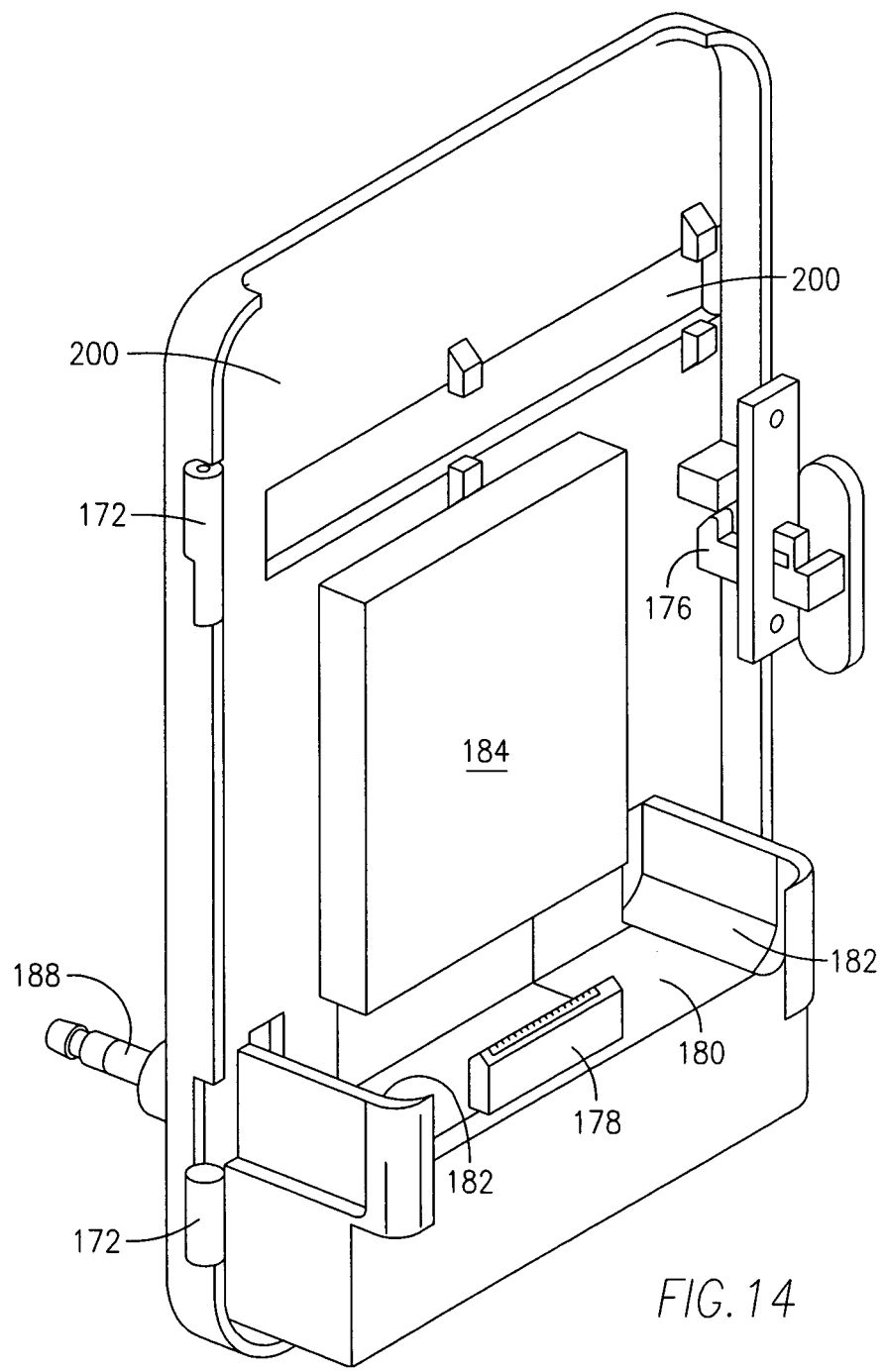
FIG. 14 is a perspective view of the left front of the portable digital audio player shown in FIGS. 10-13, with portions removed.

As shown in FIGS. 12, 14 and 16, the latch 196 is formed as a part of an elongated sliding tab 198 that fits within a recess 200 that is preferably formed in the base portion 168 and which is also preferably a part of the latch 196. One end 202 of the sliding tab 198 extends outwardly beyond the end of the recess 200 and is available to be pushed inwardly so that the latch 196 can disengage from the hole 194 and enable the enclosure 162 to be removed from the side wall 14. The construction of the sliding tab 198 is shown in FIGS. 15 to have an opposite end portion that has a generally serpentine and preferably S-shaped thinner portion 204 located between the main part of the sliding tab and an end portion 206 with the S-shaped portion 204 defining a spring for biasing the latch 196 toward its locked position as shown in FIG. 16. In this regard, it is preferred that the sliding tab 198 be made of ABS or other slightly flexible material that is capable of providing the necessary spring or biasing force. It should be understood that the dimensions of the sliding tab are such that the end 206 must be in contact with the end of the recess 200 and thereby be loaded so that a biasing force is normally applied to the latch 196 when it is installed in the enclosure 162.

Figure 17:
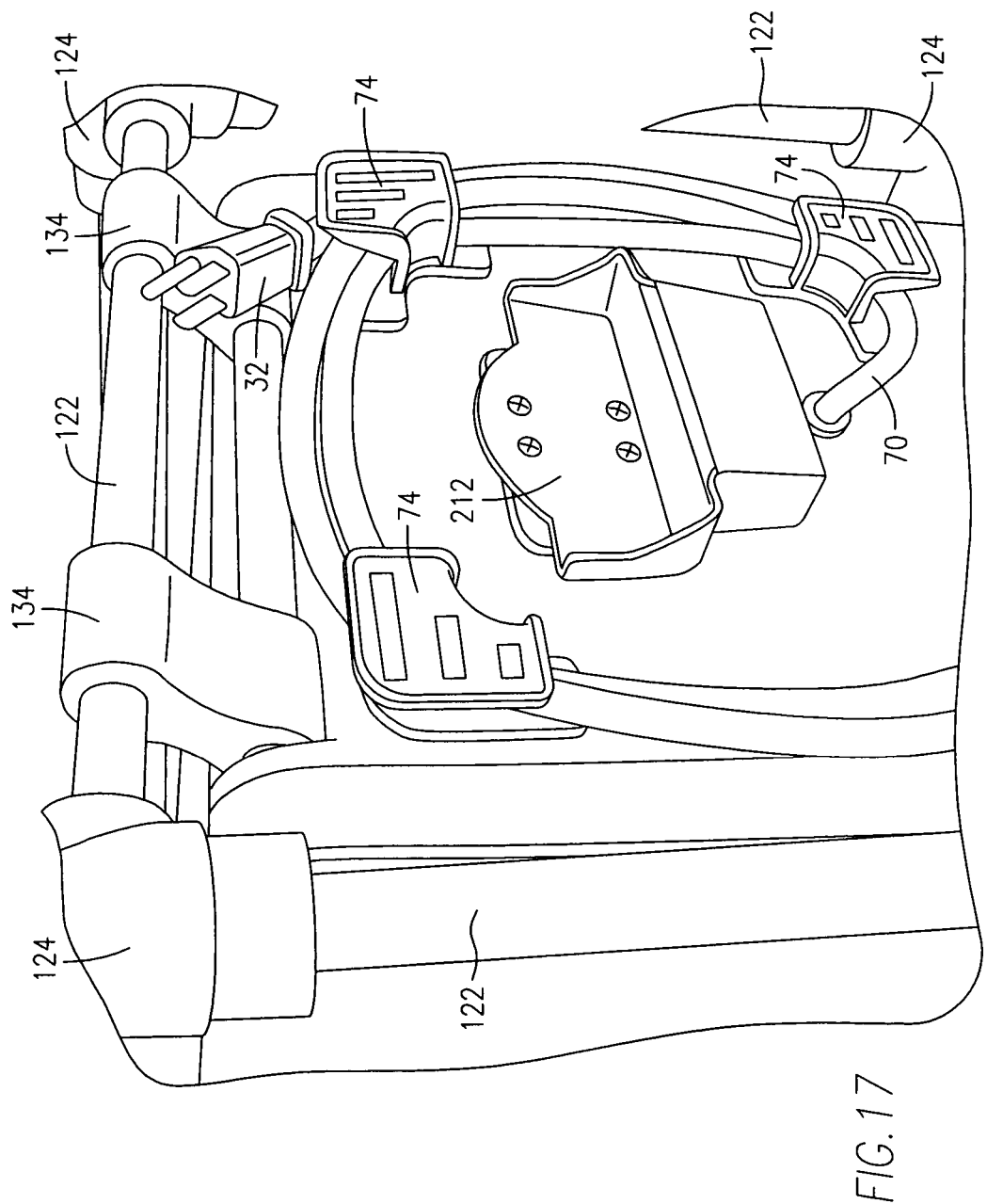
FIG. 17 is a perspective view of another embodiment of the present invention and showing the left side of the embodiment with a bracket for receiving a satellite radio receiver.
Figure 18:
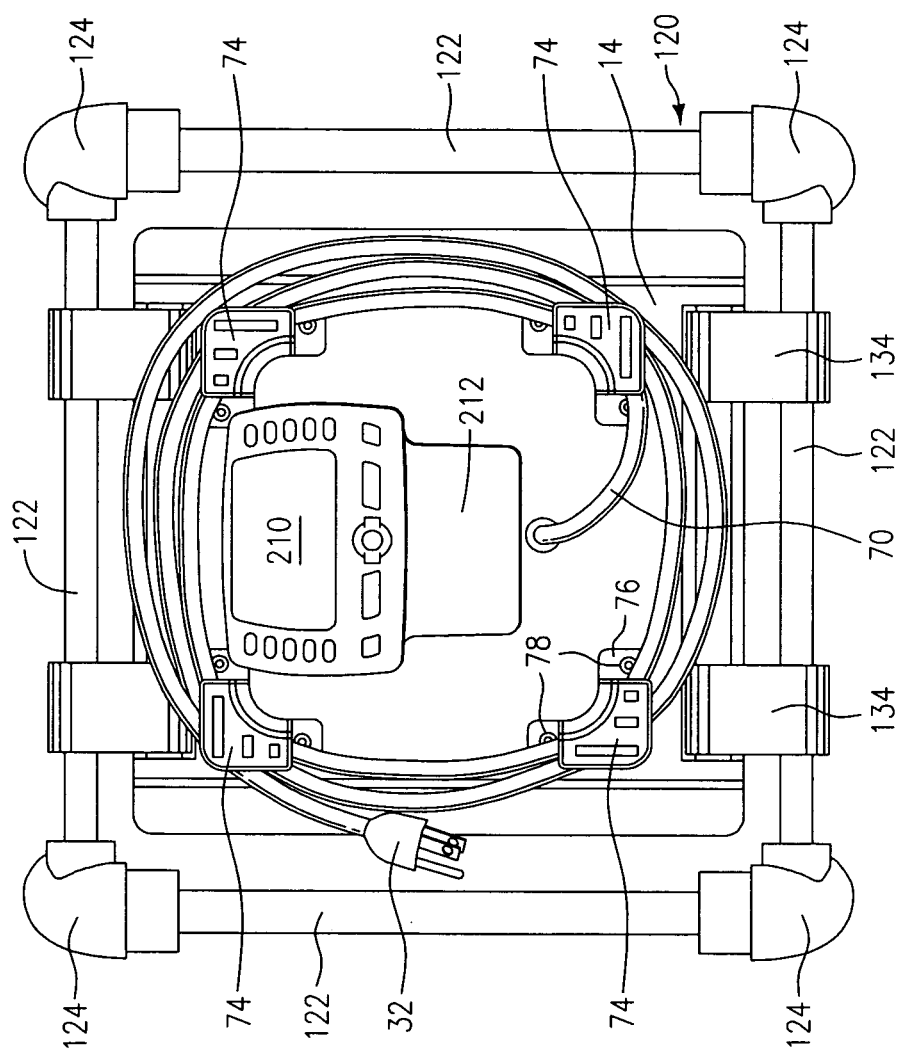
FIG. 18 is a view similar to FIG. 10 but showing the satellite radio receiver mounted on the left side of the unit.

Another embodiment of the present invention is shown in FIGS. 17 and 18 wherein a satellite radio receiver 210 is illustrated and is configured so that it has a bottom connector that engages a connector similar to the connector 178 of FIG. 14. In this configuration, the enclosure is in the form of a base portion 212 that is similar to the base portion 168 but which does not have a front cover and is therefore not completely enclosed. Since the satellite receiver 210 is preferably a unitary product that may be removed from the unit 10 so that it can be connected to a similar bracket in a user's motor vehicle, for example, the controls for operation of the radio are contained in the radio unit itself, except perhaps for an external volume control that is associated with the amplifier in the audio unit 30. It is also contemplated and is within the scope of the present invention that satellite radio unit may be the only audio receiver provided in the unit 10.

Figure 19:
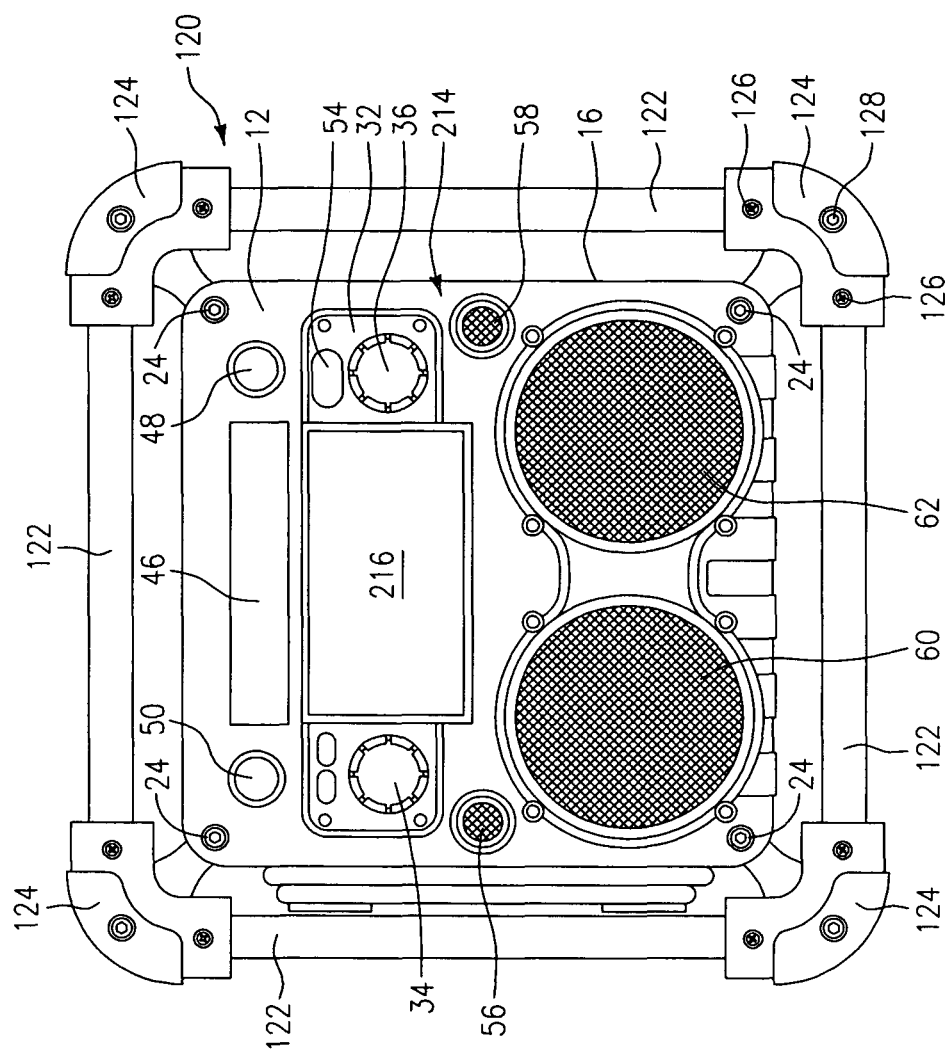
FIG. 19 is another embodiment where the unit has an audio and video player located in the front face of the unit.

Still another embodiment is shown in FIG. 19, where the unit has an audio and video player, indicated generally at 214, which is located in the front face 12 of the unit. Reference numbers have been used which are the same as those used and described for the embodiment of FIG. 2 where the functionality is substantially similar. The player comprises a video display 216 as a part of the control panel 32 with a volume control 34, and a tuning control 36. A CD player, DVD player and/or VCD player can be provided and a tray 46 is positioned above the control panel 32. It should also be understood that the display 216 may also be a part of a TV receiver. There is an eject button 48, a pause or standby button 50, as well as forward and backward adjustment buttons 52 and 54, respectively, located on the control panel 32. It should also be understood that this embodiment can be configured to accept audio and video signals from a portable audio and video source such as a portable DVD player or other video source and that the display 216 can then be used with the portable player.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. An apparatus comprising:
a housing having a number of side walls, a top and a bottom;
a charger located in said housing for charging a removable battery pack of the type which is used to power rechargeable hand tools and other tools;
a receptacle operatively connected to said charger and being capable of receiving a removable battery pack to be charged by said charger;
a signal receiving unit including an amplifier for producing audio and/or video signals located in said housing;
a cord and plug for connecting said apparatus to a source of AC power;
a first circuit for connecting said cord to said charger and said signal receiving unit, whereby AC power is applied to said signal receiving unit to power the same and AC power is also applied to said charger;
an auxiliary signal receiving input receptacle and a DC power socket are located adjacent one another in one of said side walls, said auxiliary signal receiving input receptacle being operatively connected to said amplifier in said unit configured to produce audio and/or video signals from an auxiliary source connected to said input receptacle;
an enclosure receptacle configured to support said auxiliary source and having a power plug for connecting to said DC power socket and an audio plug configured for connecting to said auxiliary audio input receptacle, an audio source connector and circuitry to interconnect said power plug and an auxiliary source placed in said enclosure receptacle and to said auxiliary source to said signal receiving unit amplifier;
a relay connected in circuit between a battery pack located in said receptacle and said signal receiving unit;
a relay coil connected in circuit between said cord and said signal receiving unit, said coil monitoring the presence of AC power being applied to said signal receiving unit and causing said relay to open circuit and isolate said signal receiving unit from said battery when AC power is applied to said signal receiving unit and close circuit when AC power is not applied to said signal receiving unit, thereby enabling said battery pack to power said signal receiving unit when AC power is not applied thereto.

2. An apparatus as defined in claim 1 wherein said enclosure receptacle further comprises a hinged latched cover for protecting an auxiliary source.

3. An apparatus comprising:
a housing having a number of side walls, a top and a bottom;
a charger located in said housing for charging a removable battery pack of the type which is used to power rechargeable hand tools and other tools;
a receptacle operatively connected to said charger and being capable of receiving a removable battery pack to be charged by said charger;
a signal receiving unit including an amplifier for producing audio and/or video signals located in said housing;
a cord and plug for connecting said apparatus to a source of AC power;
a first circuit for connecting said cord to said charger and said signal receiving unit, whereby AC power is applied to said signal receiving unit to power the same and AC power is also applied to said charger;
an auxiliary audio input receptacle and a DC power socket are located adjacent one another in one of said side walls, said auxiliary audio input receptacle being operatively connected to said amplifier in said unit configured to produce audio and/or video signals from an auxiliary source connected to said input receptacle;
an enclosure receptacle configured to support said auxiliary source and having a power plug for connecting to said DC power socket and an audio plug configured for connecting to said auxiliary audio input receptacle, an audio source connector and circuitry to interconnect said power plug and an auxiliary source placed in said enclosure receptacle and to said auxiliary source to said signal receiving unit amplifier, wherein said enclosure receptacle further comprises a latching mechanism for releasably attaching said enclosure receptacle to said housing;
a relay connected in circuit between a battery pack located in said receptacle and said signal receiving unit;
a relay coil connected in circuit between said cord and said signal receiving unit, said coil monitoring the presence of AC power being applied to said signal receiving unit and causing said relay to open circuit and isolate said signal receiving unit from said battery when AC power is applied to said signal receiving unit and close circuit when AC power is not applied to said signal receiving unit, thereby enabling said battery pack to power said signal receiving unit when AC power is not applied thereto.

4. An apparatus as defined in claim 3 wherein said latching mechanism comprises an aperture associated with said housing, said latching mechanism having a latch surface configured to engage said aperture and releasably lock the same.

5. An apparatus as defined in claim 4 wherein said aperture is located in a bracket securely attached to said housing, said bracket having a space between its inside surface adjacent said aperture and said housing surface enabling said latch surface to enter said aperture and engage said bracket in holding relation.

6. An apparatus as defined in claim 5 wherein said latch surface is part of an elongated tab that is slideable relative to said bracket, said tab being accessible by a user to disengage said latch from said housing.

7. An apparatus as defined in claim 6 wherein said tab is slideable in a recess in said enclosure receptacle.

8. An apparatus as defined in claim 6 further comprises means for biasing said tab in locking engagement.

9. An apparatus as defined in claim 8 wherein said biasing means comprises a serpentine configuration flexible portion of said tab, one end of which tab bears against said enclosure receptacle, the dimensions of said tab causing said serpentine configuration to be force loaded to provide a biasing force.

10. An apparatus as defined in claim 1 wherein said auxiliary source comprises a portable digital audio player.

11. An apparatus as defined in claim 1 wherein said auxiliary source comprises a satellite radio.

12. An apparatus as defined in claim 1 wherein said signal receiving unit comprises a TV receiver.

13. An apparatus as defined in claim 1 wherein said signal receiving unit comprises a DVD player.

14. An apparatus as defined in claim 1 wherein said signal receiving unit comprises a VCD player.

15. An apparatus as defined in claim 1 wherein said signal receiving unit comprises a CD player.

16. An apparatus as defined in claim 1 wherein said signal receiving unit comprises an AM/FM radio.

\* \* \* \* \*